(12) United States Patent
Lieblich et al.

(10) Patent No.: US 11,055,784 B1
(45) Date of Patent: Jul. 6, 2021

(54) TRANSMITTING DATA FILES WITH CONSTITUENTS AND ASSOCIATED INDEX WEIGHTS FOR LOW-CARBON INDEXES

(71) Applicant: MSCI Inc., New York, NY (US)

(72) Inventors: Sébastien R. Lieblich, Geneva (CH); Remy-Entienne Werner Briand, Geneva (CH); Thomas Kuh, Boston, MA (US); Neeraj Dabake, Mumbai (IN); Anurag Singh, Mumbai (IN)

(73) Assignee: MSCI Inc., New York, NY (US)

( * ) Notice: Subject to any disclaimer, the term of this patent is extended or adjusted under 35 U.S.C. 154(b) by 530 days.

(21) Appl. No.: 14/952,439

(22) Filed: Nov. 25, 2015

Related U.S. Application Data

(60) Provisional application No. 62/084,261, filed on Nov. 25, 2014.

(51) Int. Cl.
*G06Q 40/06* (2012.01)
*G06F 16/22* (2019.01)

(52) U.S. Cl.
CPC ......... *G06Q 40/06* (2013.01); *G06F 16/2291* (2019.01)

(58) Field of Classification Search
USPC ....................................................... 705/36 R
See application file for complete search history.

(56) References Cited

U.S. PATENT DOCUMENTS

| | | | | |
|---|---|---|---|---|
| 7,469,223 B2 * | 12/2008 | McIntyre, Jr. | ......... | G06Q 40/00 705/35 |
| 7,596,525 B1 * | 9/2009 | Repetto | ................. | G06Q 40/04 705/36 R |
| 7,599,874 B1 | 10/2009 | Repetto et al. | | |
| 7,617,143 B2 * | 11/2009 | Fornasari | ............... | G06Q 40/00 705/36 R |
| 7,685,069 B1 | 3/2010 | Subramanian et al. | | |
| 7,769,653 B2 * | 8/2010 | Rousseau | ............... | G06Q 40/06 705/35 |
| 7,769,663 B1 | 8/2010 | Subramanian et al. | | |
| 8,131,620 B1 * | 3/2012 | Steinberg | ............... | G06Q 40/06 705/36 R |
| 8,165,942 B1 | 4/2012 | Rordorf | | |
| 8,438,092 B2 | 5/2013 | Repetto et al. | | |
| 2007/0192221 A1 * | 8/2007 | Sandor | ................... | G06Q 40/00 705/35 |
| 2009/0063363 A1 * | 3/2009 | Present | ................. | G06Q 40/04 705/36 R |

(Continued)

OTHER PUBLICATIONS

"Fossil Free Indexes, The Carbon Underground" Apr. 2014, attached 20 pages (Year: 2014).*

(Continued)

*Primary Examiner* — Bruce I Ebersman
(74) *Attorney, Agent, or Firm* — K&L Gates LLP

(57) ABSTRACT

Computerized systems and methods construct low carbon indexes achieve a target level of tracking error relative to a broad market, Parent Index, while minimizing carbon exposure. The indexes can address two dimensions of carbon exposure—carbon emissions and fossil fuel reserves. By overweighting or selecting companies with low carbon emissions relative to sales and those with low potential carbon emissions per dollar of market capitalization, the indexes can reflect a lower carbon exposure that that of the broad market.

8 Claims, 2 Drawing Sheets

(56) References Cited

U.S. PATENT DOCUMENTS

Figure 1:
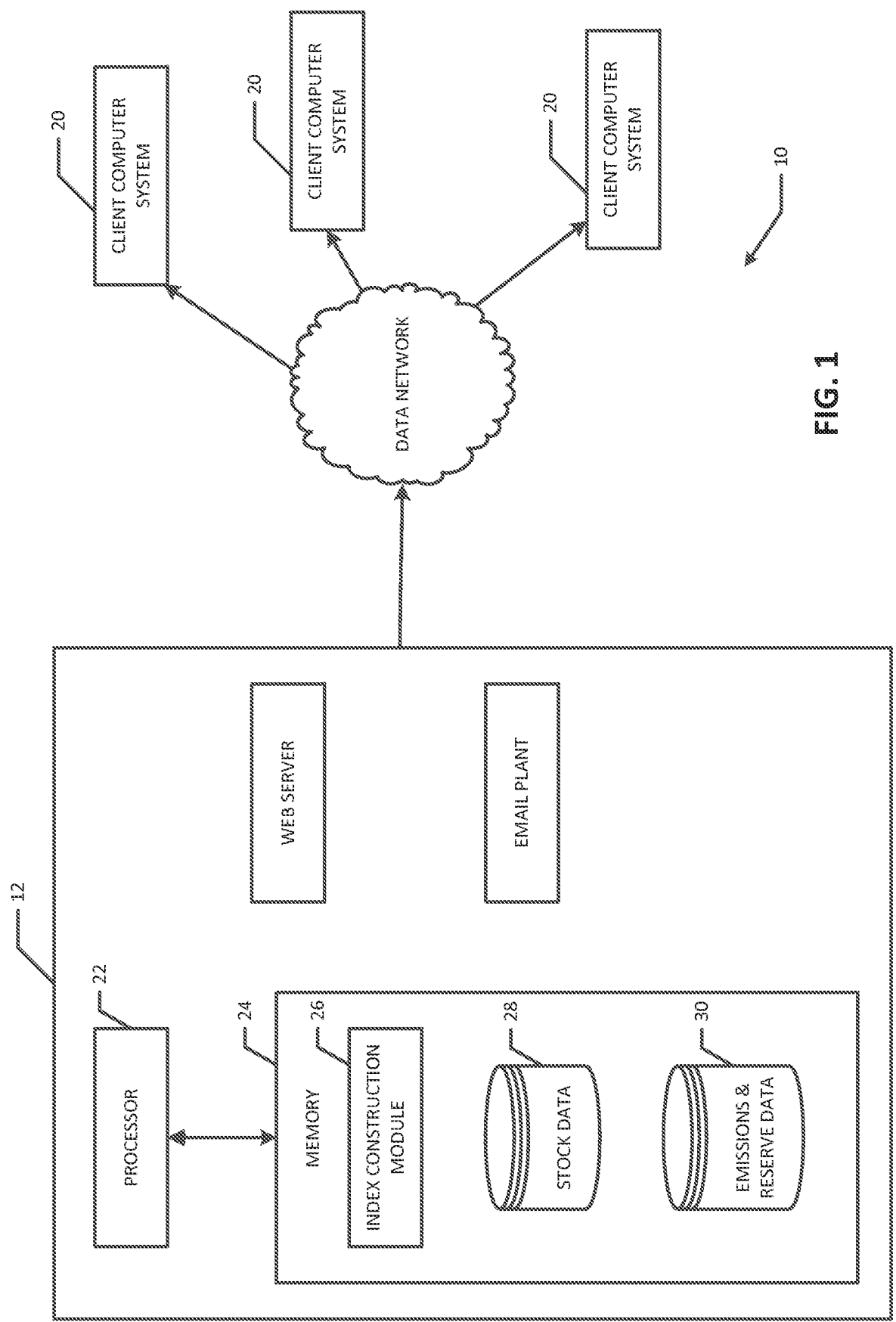

| | | | | |
|---|---|---|---|---|
| 2009/0271332 A1* | 10/2009 | Lo | ......................... | G06Q 40/06 |
| | | | | 705/36 R |
| 2010/0114796 A1 | 5/2010 | Repetto et al. | | |
| 2012/0084193 A1* | 4/2012 | Marino | ................. | G06Q 40/04 |
| | | | | 705/37 |
| 2012/0166358 A1* | 6/2012 | Steinberg | ............... | G06Q 40/06 |
| | | | | 705/36 R |
| 2014/0100937 A1* | 4/2014 | Na | ......................... | G06Q 50/06 |
| | | | | 705/14.27 |

OTHER PUBLICATIONS

The Carbon Undergound (Year: 2014).*
Fossil Free Indexes "the Carbon Underground" (Year: 2014).*

\* cited by examiner

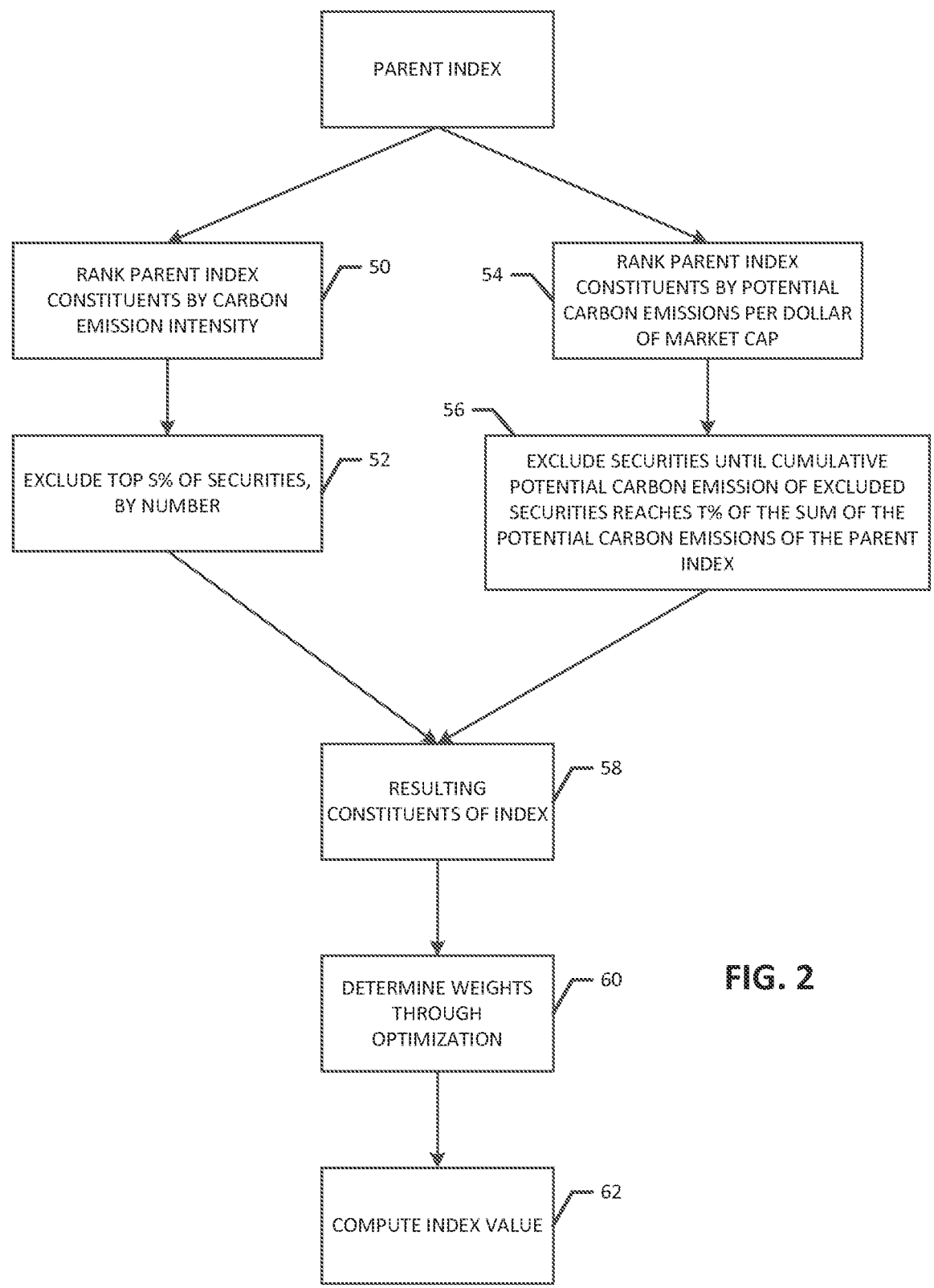

US 11,055,784 B1

TRANSMITTING DATA FILES WITH CONSTITUENTS AND ASSOCIATED INDEX WEIGHTS FOR LOW-CARBON INDEXES

PRIORITY CLAIM

The present application claims priority to U.S. provisional patent application Ser. No. 62/084,261, filed Nov. 25, 2014, which is incorporated herein by reference in its entirety.

BACKGROUND

A stock index measures the value of a section of the stock market. It is computed typically by averaging the stock prices of the selected stocks included in the index ("the constituent stocks") according to some weighting scheme, usually by market capitalization. The constituent stocks for an index are often selected based on whether they satisfy some criteria or screens associated with the purpose of the index. The screens could be based on market capitalization and geographic region or country. There are many established large-cap, mid-cap, small-cap indexes for various countries and geographic regions. Additionally, there are industry-based indexes (e.g., semiconductor industry), as well as environmental-type indexes, such as carbon-related indexes, that are comprised of constituent companies with low carbon emissions, while seeking to track the return of a Parent Index. One such carbon-related index is designed to measure the performance of several hundred companies with relatively low carbon emissions, while seeking to closely track the return of its parent index. In most cases, the constituent stocks for all of these types of indexes are reconstituted, or "rebalanced," periodically, such as two to four times per year.

Index funds are ways for investors to track a desired index. Such funds, which are usually mutual funds or exchange-traded funds, attempt to replicate the movements of an index by holding the same stocks as the index in the same proportion as the index (although some index funds statistically sample the market and hold representative stocks). Index funds are desirable for many investors because they allow the investors to track the performance of the market (corresponding to the index) passively with lesser costs and expenses than actively managed funds.

SUMMARY

In one general aspect, the present invention is directed to computerized systems and methods for constructing low carbon indexes. The low-carbon indexes of the present invention can achieve a target level of tracking error relative to a broad market, Parent Index, while minimizing carbon exposure. The indexes disclosed herein address two dimensions of carbon exposure-carbon emissions and fossil fuel reserves. By overweighting or selecting companies with low carbon emissions relative to sales and those with low potential carbon emissions per dollar of market capitalization ("market cap"), the indexes can reflect a lower carbon exposure that that of the broad market.

FIGURES

Various embodiments of the present invention are described herein by way of example in conjunction with the following figures, wherein:

FIG. 1 is a diagram of a computer system for constructing low carbon indexes according to various embodiments of the present invention; and FIG. 2 is a flow chart illustrating a process flow of the computer system of FIG. 1 for constructing low carbon indexes according to various embodiments of the present invention.

DESCRIPTION

"Constructing" an index means that at least the constituent financial securities (e.g., stocks) and their associated weights for the index are determined. Constructing a low-carbon index per the present invention may also include calculating the present value for the low-carbon index based on the market caps for the constituent financial securities in the low-carbon index. In most of the embodiments described below, the financial securities are stocks, such that low-carbon stock indexes are constructed, but the invention is not so limited and it should be recognized that other types of financial securities could be the constituents for the low-carbon indexes, such as bonds or other types of debt securities.

FIG. 1 is a diagram of a computerized system 10 for constructing one or more low-carbon indexes according to various embodiments. It includes a central computer system 12 that constructs the low-carbon indexes by, among other things, determining the constituent stocks for the low-carbon indexes and the constituent stocks' associated index weightings. The central computer system 12 may also calculate and update the present value of the low carbon indexes based on the market caps of the stocks in the indexes after the market closes on each stock trading day. The central computer system 12 may be implemented by one or a number of networked computer devices, such as personal computers, servers, mainframes, workstations, etc. The central computer system 12 may include at least one processor 22 and at least one memory unit 24 (only one of each is shown in FIG. 1 for the sake of simplicity). The memory 24 may store software that is executed by the processor 22. In particular, the memory 24 may store an index construction module 26 that, when executed by the processor 22, causes the processor 22 to construct the one or more low-carbon indexes. The module 26 includes software, written in any suitable language, that when executed by the processor 22 causes the processor 22 to construct the low carbon indexes described herein. Data about the stocks, including the daily stock prices, outstanding shares (from which market cap can be determined), annual revenue (e.g., sales), etc., may be stored in the stock database 28 of the memory 24. Only one database 28 is shown in FIG. 1, but it should be recognized that the stock data may be stored across numerous database systems (such as a federated database). The stock data may be provided by one or more data feed providers and used, for example, (1) to determine the constituent stocks in the index and their respective weightings in the index, and (2) to compute the index value. The data feed providers may provide the stock data to the central computer system 12 electronically through APIs or raw data files.

The carbon exposure of a security may be measured in terms of the greenhouse gas (GHG) emissions and potential carbon emissions from fossil fuel reserves for the issuer company of the security (and its subsidiaries). For example, a company can use sensors or meters to measure fuel and energy consumption in order to calculate its annual GHG emissions value. A company can compute estimations of, among other things, its so-called Scope 1 (direct GHG) and Scope 2 (energy indirect) emissions. Scope 1 emissions include activities that release emissions directly into the atmosphere, such as emissions from combustion in owned or controlled boilers, furnaces, vehicles, and emissions from chemical production in owned or controlled process equipment. Scope 2 emissions are released into the atmosphere from consumption of purchased electricity, heat, steam and cooling. A common approach for a company to calculate its GHG emissions is to apply documented emission factors to known activity data from the company. For example, gas, electricity, and water meters can track the gas, electricity and water, respectively, used by a company's operations. These meter readings (in addition to other sensed data when available) can be used in conjunction with applicable emission factors for various activities to compute the company's annual GHG emissions (see e.g., www.ghgprotocol.org). The companies can then report their annual GHG emissions value to relevant authorities and/or data collectors.

The GHG emissions value data and fossil fuel reserve data for the issuer companies may be stored in a database 30 of the memory 24. This data may be obtained from any suitable source, such as MSCI's ESG CarbonMetrics data from MSCI ESG Research Inc. MSCI ESG Research collects the company-specific direct (Scope 1) and indirect (Scope 2) GHG emissions data from company public documents and/or the Carbon Disclosure Project. If a company does not report GHG emissions, then MSCI ESG Research estimates the company's Scope 1 and Scope 2 GHG emissions. MSCI ESG Research updates its data on an annual basis. Since the current carbon emissions of a company are directly influenced by its current business activity, the carbon emissions of a company can be normalized for size by dividing the annual carbon emissions of the company by the annual revenue/sales of the company (stored in the database 28). For newly added companies to the index that do not report emission data and where the emissions data provider has not estimated the GHG emissions yet, the average emissions per dollar of issuer market capitalization for the companies in the same industry group can be used, multiplied by the market capitalization of the company as the estimated emission for the newly added company. Again, only one database 30 is shown in FIG. 1, but it should be recognized that the emissions and reserve data may be stored across numerous database systems (e.g., a federated database.)

The carbon emission data provider (e.g., MSCI ESG Research) can collect fossil fuel reserves data where relevant for companies which have reserves, typically in the Oil & Gas, Coal Mining and Electric Utilities industries. Fossil fuel reserves can be used for several applications including energy or industrial (e.g. coking coal used for steel production). In various embodiments of the low carbon indexes disclosed herein, only fossil fuel reserves used for energy are taken into account. The data can be updated on an annual basis and based on information disclosed by companies. Sources include company publications, other public records and third party data providers. For newly added companies to the index where data are not available yet, an assumption of zero fossil fuel reserves can be used or some other suitable assumption. The size of reserves of a company typically influences its market valuation, and hence the reserves can be normalized for size by dividing the potential carbon emissions of the company by its market capitalization. To convert reserves data to potential carbon emissions, a formula from the Potsdam Institute for Climate Impact Research can be applied. For more details, see Malte Meinshausen et al., "Greenhouse-gas emission targets for limiting global warming to 2° C.," Nature 458, 1158-1162 (30 Apr. 2009), which is incorporated herein by reference in its entirety.

The memory 24 may be embodied as solid state memory (e.g., ROM), hard disk drive systems, SSDs, RAID, disk arrays, storage area networks (SANs), and/or any other suitable system for storing computer data and software. In addition, the memory 24 may comprise caches, including web caches and database caches. Parts of the memory 24 may be co-located with the processor 22 of the computer system 12 or remotely connected to the computer system 12 via a network connection (e.g., a LAN).

The low carbon indexes can be constructed in various ways according to the present invention. One ways is to select companies (i.e., constituents) with low carbon emissions relative to sales and those with low potential carbon emissions per dollar of market capitalization. An index constructed in such a manner reflects a lower carbon exposure than that of the broad market. An optimization process minimizes the tracking error relative to the desired Parent Index, which is preferably a market cap-weighted equity index. The Parent Index could be a global, regional, or domestic index. Also, different size indexes could be used (in terms of market cap of the constituents), such as all cap, large cap, mid cap, small cap, combinations thereof, etc. MSCI offers a number of suitable Parent Indexes, including the ACWI All Cap or ACWI IMI indexes, as well as many others.

FIG. 2 is a diagram of the process flow of the processor 22 when executing the code of the index construction 24 according to such an embodiment. For purposes of this description, this index methodology is referred to as a "Leaders" index. The constituents of the Leaders low carbon index can be determined as the constituents of the Parent Index that remain after excluding Parent Index constituents based on GHG emissions and/or reserves. As shown in FIG. 2, at step 50 the Parent Index constituents are ranked in descending order by carbon emission intensity, which may be computed for each Parent Index constituent by dividing the constituent's annual emissions by its annual sales. Next at step 52, the top S % (e.g., 20%) of the Parent Index constituents, by number, in terms of carbon emission intensity, are removed (or excluded) (i.e., the top quintile (20%) of companies with the highest carbon emission intensities are removed). In various embodiments, adjustments can be made to the exclusions to maintain industry sector balance. For example, if the cumulative weight of securities excluded from any industry sector more than R % of the weight of the sector in the Parent Index (e.g., 30%), no further securities from that sector are excluded. The relevant sectors for this rebalancing can be the Global Industry Classification Standard (GICS) sectors.

As for the reserve dimension, at step 54 the Parent Index constituents are ranked by potential carbon emissions per dollar (or other suitable currency) of market cap. The potential carbon emissions for the constituents can be derived from constituents' reserves, where data about the companies' reserves may also be stored in the database 30. Thus, for each Parent Index constituent, the potential carbon emissions can be determined based on the constituent's reserves; then the potential carbon emissions per dollar of market cap can be determined based on the constituent's market cap; then the Parent Index constituents can be ranked in descending order by potential carbon emissions per dollar of market cap. Next, at step 56, Parent Index constituents are excluded until the cumulative potential carbon emission of the excluded constituents reaches some pre-determined percentage (e.g., 50%) of the sum of the potential carbon emission of the constituents of the Parent Index. That is, the companies with the highest potential carbon emissions per dollar of market cap are removed in descending order, one by one, until the cumulative potential carbon emission of the excluded constituents reaches the threshold level (e.g., 50% of the sum of the potential carbon emission of the constituents of the Parent Index).

The two screens (steps 52 and 56) can applied such that the remaining, unexcluded Parent Index constituents at step 58, which constitute the constituents of the low carbon index, are the Parent Index constituents that are not excluded at step 52 or step 56. In other words, if a Parent Index constituent is excluded at either step 52 or 56 or both, it is not included in the Leaders low carbon index.

Next, at step 60, the index weights for the Leaders low carbon index constituents are determined through optimization. In various embodiments, the objective of the optimization is to minimize tracking error relative to the Parent Index, with the following constraints to ensure replicability and investability:

The maximum weight of an index constituent will be restricted to $N_1$ times (e.g., 20 times) its weight in the Parent Index;

The country weights in such a global low carbon index will not deviate more than $+/-X_1\%$ (e.g., $+/-2\%$) from the country weights in the Parent Index;

The sector weights in the low carbon index will not deviate more than $+/-X_2\%$ (e.g., $+/-2\%$) from the sector weights in the Parent Index; and The reduction in the Carbon Emission Intensity and in the potential emissions per dollar of market capitalization of the low carbon index relative to the Parent Index will be at least $X_3\%$ (e.g., 50%).

Any suitable optimization process can be used. In various embodiments, the Barra Open Optimizer can be used, in combination with the relevant Barra Equity Model or other suitable risk model. The Barra Open Optimizer, available from MSCI Inc., is an optimization library that utilizes multiple optimization engines, including Convex Quadratic Programming, Non-linear Programming, and Second Order Cone Programming solvers. More details about suitable risk models can be found in U.S. patent application Ser. No. 61/561,003, filed Nov. 17, 2011, and U.S. Pat. No. 8,756,140, issued Jun. 17, 2014, both of which are incorporated herein by reference in their entirety.

With the index constituent weights determined at step 60, the low carbon index value can be computed as the weighted sum of the market capitalization for the index constituents, e.g.:

$$IndexValue = \sum_{i=1}^{N} w_i p_i$$

where IndexValue is the value of the low carbon index, and $p_i$ and $w_i$ are the updated market capitalization and associated index weight, respectively, for the $i=1, \ldots, N$ constituent stocks in the index.

Another way to construct the low carbon index, in another embodiment referred to herein as the "Target" low carbon index, is to reweight the constituents of a Parent Index using an optimization process subject to certain optimization objectives and constraints. In such an embodiment the optimization objective can be to minimize the carbon exposure (in terms of GHG emissions and potential emissions from reserves, as described above) subject to a tracking error constraint of $Y_1$ basis points (e.g., 30 basis points) relative to the Parent Index. The following additional constraints can also be used:

The maximum weight of an index constituent will be restricted to $N_2$ times (e.g., 20 times) its weight in the Parent Index The country weights in such a global low carbon index will not deviate more than $+/-Z_1\%$ (e.g., $+/-2\%$) from the country weights in the Parent Index;

The sector weights in the low carbon index will not deviate more than $+/-Z_2\%$ (e.g., $+/-2\%$) from the sector weights in the Parent Index, with the exception of the Energy Sector where no sector weight constraint is applied.

Again, in various embodiments, the Barra Open Optimizer or some other suitable optimizer can be used to determine the weights for the constituents of the low carbon index. In various embodiments, after the optimization process, any securities with extremely low weights (less than $\frac{1}{10}$th of the minimum weight in the Parent Index) can be eliminated, and their weight proportionately distributed over the remaining securities in order to determine the final pro forma Target low carbon index. Also, once the weights are determined, the index value can be computed as the weighted sum of the market capitalization for the index constituents as shown in the formula above.

For any of the above-described low carbon indexes, the index value can be computed after the close of the markets following each trading day. The process for determining the low carbon index constituents and their weights (referred to as "rebalancing") may be determined less frequently, such as two times per year (semi-annual). At each rebalancing, a constraint factor may be calculated for each constituent in the low carbon index. The constraint factor may be the weight in the low carbon index at the time of the rebalancing divided by the weight in the Parent Index. The constraint factors as well as the constituents in the index remain constant between index reviews except in case of corporate events as described below.

The low carbon indexes according to the present invention can follow the event maintenance of the Parent Index subject to the following exceptions. First, IPOs and other newly listed securities will only be considered for inclusion at the next Semi-Annual Index Review, even if they qualify for early inclusion in the Parent Indexes. Second, there is no early inclusion of new securities to the low carbon index. A constituent deleted from the Parent Index following a corporate event or during the Index Review of the Parent Index will be simultaneously deleted from the low carbon index.

Returning to FIG. 1, the central computer system 12 can distribute information about the low carbon indexes to various client computer systems 20 via a data network 18. The distributed information can include, following initial construction and any subsequent rebalancing, the constituents of the relevant low carbon index(es) and the respective index weightings for the constituents in the index(es). Also, the index value can be distributed each time it is computed (e.g., following each trading day). The client computer systems 20 may include firms that manage index funds that track the low carbon index(es), as well as news wires, such as Bloomberg, etc. In various embodiments, the data network 18 includes a computer data network such as an IP network, such as the Internet, an intranet, an extranet, a LAN(s), a WAN(s), etc. It could also use other types of communication protocols, such as Ethernet, ATM, etc., and it could include wired and/or wireless links. In such an embodiment, the central computer system 12 may include one or more web servers 40 and/or an email plant 42 for distributing the index information in one or more electronic files via the network 18 to the client computer systems 20.

In various embodiments, the present invention is directed to systems and method for transmitting a listing of constituent companies and associated index weights for each constituent company of a low carbon index. The system may comprise a plurality of fuel and electricity sensors associated with the companies in a parent index from which the low carbon index is constructed. The sensors sense the fuel and electricity consumed by the companies, which data are used to compute greenhouse gas (GHG) emission values for the companies. The system further comprises a central computer system 12 for determining, based on the GHG emission values, the constituent companies for the low carbon index and associated index weights for each of the constituent companies in the low carbon index. In one embodiment, the central computer system determines the constituents and their associated index weights by: (i) ranking the companies in the parent index, in descending order, by carbon emission intensity, to generate a carbon emission intensity ranking, wherein a company's carbon emission intensity is determined based on the company's GHG emission values and its annual revenue; (ii) removing, in a first removing step, a highest X % (e.g., 20%) of companies in the carbon emission intensity ranking; (iii) ranking the companies in the parent index, in descending order by potential carbon emissions, to generate a potential carbon emissions ranking, where the companies' potential carbon emissions are determined based the company's fossil fuel reserves; (iv) removing, in a second removing step, companies from the top of the potential carbon emissions ranking until a cumulative potential carbon emission of removed companies meets or exceeds Y % (e.g., 50%) of a sum of the potential carbon emissions of every company in the parent index; and (v) determining index weights for each of the constituent companies of the low carbon index through optimization, where the constituent companies of the low carbon index are the companies of the parent index that are not removed in either of the first or second removing steps. In addition, the system comprises one or more client computer systems 20 in communication with the central computer system 12 via an IP network, wherein the client computer systems receive from the central computer system one or more electronic files that identify the constituent companies of the low carbon index and each of the constituent company's associated index weight.

In various implementations, the central computer system computes an index value for the low carbon index based on market caps for the constituent companies and their associated index weights, and the file(s) received by the one or more client computer systems from the central computer system further includes the computed index value. Also, the central computer system computes the carbon emission intensity for each company in the parent index by computing a quotient of the company's GHG emissions value over a time period (e.g., a calendar year) by its revenue over the time period (e.g., annual sales). In addition, in the first removing step, the central computer can cease removing companies from the parent index in a particular industry sector when the cumulative weight of companies excluded from that sector is more than some threshold of the weight of the sector in the parent index. Further, the central computer system can rank the companies in the parent index, in descending order by potential carbon emissions, by: (i) computing estimations of potential carbon emissions for each company in the parent index based on each company's fossil fuel reserves; and (ii) computing a quotient value for each company in the parent index corresponding to their estimated potential carbon emissions divided by the company's market capitalization in dollars, where the companies are ranked in descending order based on their quotient value. Still further, an objective of the optimization that determines the index weights for the constituent companies of the low carbon index can comprise minimizing a tracking error relative to the parent index.

In another implementation, the central computer system 12 determines the constituents and their associated index weights differently, by: (i) reweighting the companies in the parent index using a optimization process, with an optimization objective of minimizing carbon exposure, where the carbon exposure of the companies in the parent index is determined based on both the GHG emission values of the companies and potential carbon emissions of the companies, and where the optimization is subject to at least one constraint, such as a tracking error constraint of Y1 basis points relative to the parent index; (ii) removing companies in the parent index whose reweighted weight is less than or equal to a threshold minimum weighting value; and (iii) determining the index weights of the non-removed companies of the parent index, which are the constituent companies of the low carbon index, by proportionately distributing the reweighted weights of the removed companies across the non-removed companies of the parent index.

In various implementation, one or more constraints can be used in the optimization process, such as: a first constraint where a maximum index weight for any index constituent is restricted to Y2 times its weight in the parent index; a second constraint where, for a global parent index, the country weights do not deviate more than Y3% from the country weights in the parent index; and (iii) a third constraint where industry sector weights in the low carbon index will not deviate more than Y4% from the industry sector weights in the parent index (with the exception of an energy sector where no sector weight constraint is applied). Y2, Y3 and Y4 can be preselected, pre-established values.

In various embodiments disclosed herein, a single component may be replaced by multiple components and multiple components may be replaced by a single component to perform a given function or functions. Except where such substitution would not be operative, such substitution is within the intended scope of the embodiments. Any servers described herein, for example, may be replaced by a "server farm," cloud computing environment, or other grouping of networked servers (such as server blades) that are located and configured for cooperative functions. It can be appreciated that a server farm or cloud computing environment may serve to distribute workload between/among individual components of the farm or cloud, as the case may be, and may expedite computing processes by harnessing the collective and cooperative power of multiple servers. Such server farms or clouds may employ load-balancing software that accomplishes tasks such as, for example, tracking demand for processing power from different machines, prioritizing and scheduling tasks based on network demand and/or providing backup contingency in the event of component failure or reduction in operability.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a computer, a firmware element embedded in hardware, or any combination thereof.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A system for transmitting a listing of constituent companies and associated index weights for each constituent company of a low carbon index, the system comprising:
   a plurality of fuel consumption sensors and a plurality electricity consumption sensors associated with the companies in a parent index from which the low carbon index is constructed, wherein the plurality of fuel consumption sensors are for sensing fuel consumed by the companies and the plurality of electricity consumption sensor are for sensing electricity consumed by the companies;
   a central computer system that comprises an index construction software module for determining the constituent companies for the low carbon index and associated index weights for each of the constituent companies in the low carbon index, by performing steps that comprise:
      compute a carbon emission intensity for each company in the parent index, wherein the carbon emission intensity for a company in the parent index is computed by dividing annual GHG emissions by the company by annual sales for the company, wherein the annual GHG emissions for the company are determined from fuel and electricity consumption data from the plurality of fuel consumption sensor and the plurality of electricity consumption sensors;
      rank the companies in the parent index based on carbon emission intensity;
      compute a potential carbon emissions per dollar value for each company in the parent index, wherein the potential carbon emissions per dollar value for a company in the parent index is computed by dividing potential carbon emissions of the company by a market capitalization for the company, wherein the potential carbon emissions of the company is a based on fossil fuel reserves for the company;
      rank the companies in the parent index based on potential carbon emissions per dollar value;
      making a company from the parent index a potential constituent company in the low carbon index based on the company's rankings in the carbon emission intensity ranking and the potential carbon emissions per dollar value ranking;
      reweighting the potential constituent companies in the low carbon index using an optimization process, with an optimization objective of minimizing carbon exposure, wherein the optimization is subject to at least one constraint, wherein the at least one constraint comprises a tracking error constraint, wherein the tracking error constraint constrains a tracking error relative to the parent index such that the tracking error does not exceed Y1 basis points, wherein Y1 is a preselected threshold value;
      removing potential constituent companies from the low carbon index whose reweighted weight is less than or equal to a threshold minimum weighting value such that non-removed potential constituent companies comprise the constituent companies for the low carbon index; and
      determining the index weights of the constituent companies of the low carbon index by proportionately distributing the reweighted weights of the removed potential companies across the constituent companies of the low carbon index; and
   one or more client computer systems in communication with the central computer system via an IP network, wherein the client computer systems receive from the central computer system one or more electronic files that identify the constituent companies of the low carbon index and each of the constituent company's associated index weight.

2. The system of claim 1, wherein:
   the central computer system is further for computing an index value for the low carbon index based on stock prices for the constituent companies and their associated index weights; and
   the one or more files received by the one or more client computer systems from the central computer system further includes the computed index value.

3. The system of claim 1, wherein the optimization process uses a first constraint where a maximum index weight for any index constituent is restricted to Y2 times its weight in the parent index, wherein Y2 is a preselected value.

4. The system of claim 3, wherein:
   the parent index is a global index; and
   the optimization process uses a second constraint where country weights do not deviate more than Y3% from the country weights in the parent index, where Y3% is a preselected value.

5. The system of claim 4, wherein the optimization process uses a third constraint where industry sector weights in the low carbon index will not deviate more than Y4% from the industry sector weights in the parent index, with the exception of an energy sector where no sector weight constraint is applied.

6. A method comprising:
   determining, by an index construction software module of a central computer system, constituent companies for a low carbon index and associated index weights for each of the constituent companies in the low carbon index based on greenhouse gas (GHG) emission values for each company in a parent index from which the low carbon index is constructed, wherein determining the constituent companies and associated index weights comprises:
      computing, by the index construction software module of the central computer system, a carbon emission intensity for each company in the parent index, wherein the carbon emission intensity for a company in the parent index is computed by dividing annual GHG emissions by the company by annual sales for the company, wherein the annual GHG emissions for the company are determined from fuel and electricity consumption data from a plurality of fuel consumption sensors and a plurality of electricity consumption sensors;
      ranking, by the index construction software module of the central computer system, the companies in the parent index based on carbon emission intensity;

computing, by the index construction software module of the central computer system, a potential carbon emissions per dollar value for each company in the parent index, wherein the potential carbon emissions per dollar value for a company is computed by dividing potential carbon emissions of the company by a market capitalization for the company, wherein the potential carbon emissions of the company is a based on fossil fuel reserves for the company;

ranking, by the index construction software module of the central computer system, the companies in the parent index based on potential carbon emissions per dollar value;

making, by the index construction software module of the central computer system, a company from the parent index a potential constituent company in the low carbon index based on the company's rankings in the carbon emission intensity ranking and the potential carbon emissions per dollar value ranking;

reweighting, by the index construction software module of the central computer system, the potential constituent companies of the low carbon index using an optimization process, with an optimization objective of minimizing carbon exposure, wherein the optimization is subject to at least one constraint, wherein the at least one constraint comprises a tracking error constraint, wherein the tracking error constraint constrains a tracking error relative to the parent index such that the tracking error does not exceed Y1 basis points, wherein Y1 is a preselected threshold value;

removing, by the index construction software module of the central computer system, potential constituent companies from the low carbon index whose reweighted weight is less than or equal to a threshold minimum weighting value such that non-removed potential constituent companies comprise the constituent companies for the low carbon index; and determining, by the index construction software module of the central computer system, the index weights of the constituent companies of the low carbon index by proportionately distributing the reweighted weights of the removed potential constituent companies across the constituent companies of the low carbon index; and transmitting, by the central computer system, to one or more client computer systems via an IP network, one or more electronic files that identify the constituent companies of the low carbon index and each of the constituent company's associated index weight.

7. The method of claim 6, further comprising computing an index value for the low carbon index based on stock prices for the constituent companies and their associated index weights, wherein the one or more files received by the one or more client computer systems from the central computer system further includes the computed index value.

8. The method of claim 6, wherein the optimization process uses one or more constraints selected from the group consisting of:

a first constraint where a maximum index weight for any index constituent is restricted to Y2 times its weight in the parent index, wherein Y2 is a preselected value;

a second constraint where, for a global parent index, country weights do not deviate more than Y3% from the country weights in the parent index, where Y3% is a preselected value; and a third constraint where industry sector weights in the low carbon index will not deviate more than Y4% from the industry sector weights in the parent index, with the exception of an energy sector where no sector weight constraint is applied.

* * * * *